(12) United States Patent
Levidow et al.

(10) Patent No.: US 7,571,349 B2
(45) Date of Patent: Aug. 4, 2009

(54) CONFIGURATION REPLICATION FOR SYSTEM RECOVERY AND MIGRATION

(75) Inventors: Bjorn Benjamin Levidow, Bellevue, WA (US); Neil Scott Fishman, Bothell, WA (US); Eric B. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 11/506,423

(22) Filed: Aug. 18, 2006

(65) Prior Publication Data

US 2008/0126856 A1   May 29, 2008

(51) Int. Cl.
   *G06F 11/00* (2006.01)
(52) U.S. Cl. .................................... 714/15
(58) Field of Classification Search ............... 714/4, 714/15, 16, 20, 38, 39, 47
   See application file for complete search history.

(56) References Cited

U.S. PATENT DOCUMENTS

| | | | |
|---|---|---|---|
| 5,426,774 A * | 6/1995 | Banerjee et al. ............... 714/16 |
| 5,781,716 A * | 7/1998 | Hemphill et al. ............... 714/4 |
| 6,335,937 B1 * | 1/2002 | Chao et al. .................. 370/426 |
| 6,523,130 B1 | 2/2003 | Hickman et al. | |
| 6,854,069 B2 * | 2/2005 | Kampe et al. ................... 714/4 |
| 7,409,594 B2 * | 8/2008 | Mukherjee et al. ............. 714/26 |
| 2002/0133734 A1 * | 9/2002 | Sarathy et al. ................. 714/4 |
| 2003/0093712 A1 | 5/2003 | Cepulis | |
| 2003/0182427 A1 | 9/2003 | Halpern | |
| 2004/0128664 A1 | 7/2004 | Johnson | |
| 2005/0015685 A1 * | 1/2005 | Yamamoto .................... 714/54 |
| 2005/0102289 A1 | 5/2005 | Sonoda et al. | |
| 2005/0182969 A1 * | 8/2005 | Ginter et al. ................. 713/201 |
| 2005/0223010 A1 * | 10/2005 | Murray ......................... 707/10 |
| 2005/0273645 A1 | 12/2005 | Satran et al. | |
| 2006/0117212 A1 | 6/2006 | Meyer et al. | |
| 2006/0129872 A1 * | 6/2006 | Fung et al. ...................... 714/4 |

OTHER PUBLICATIONS

Christodoulopoulou et al., "Fast and Transparent Recovery for Continuous Avaliability of Cluster-based Servers," Principles and Practice of Parallel Programming, Proceedings of the eleventh ACM SIGPLAN symposium on Principles and practice of parallel programming, Mar. 29-31, 2006, pp. 221-229.

Devarakonda et al., "Server Recovery Using Naturally Replicated State: A Case Study," International Conference on Distributed Computing Systems, Proceedings of the 15th International Conference on Distributed Computing Systems, May 30-Jun. 2, 1995, pp. 213-220.

Leonardo et al., "An Adaptable Replication Scheme for Reliable Distributed Object-Oriented Computing," Advanced Information Networking and Applications, Proceedings of the 17th International Conference on Advanced Information Networking and Applications, Mar. 27-29, 2003, pp. 602-605.

* cited by examiner

*Primary Examiner*—Nadeem Iqbal

(57) ABSTRACT

Aspects of the subject matter described herein relate to system state changes. In aspects, a state change monitor detects a state change, determines whether the state change is within a set of state changes that are monitored, and, if so, logs data regarding the state change. The data and any other data needed to rollback the state change is exported to other nodes. The other nodes may store the data for rollback or migration purposes and/or adjust their operation so that they may operate correctly in view of the state change.

20 Claims, 7 Drawing Sheets

CONFIGURATION REPLICATION FOR SYSTEM RECOVERY AND MIGRATION

BACKGROUND

In use, a computer may crash or begin operating in a non-desired manner. For example, a hard drive may malfunction, a component may fail, or software that used to work may stop functioning correctly. A malfunction may be caused by a variety of sources including environmental causes (e.g., lightning), computer viruses, or user error (e.g., deleting a software component, reconfiguring a software component, and so forth).

One response to a malfunction is, where possible, to restore the computer to a previous state. This may involve locating recovery tapes, executing recovery software, and restoring a backup of a previous state of the computer. Often, in such a recovery process, data and configuration that currently exists on the computer is erased or overwritten when restoring the previous state. Additional data and configuration that was created after the previous backup but before the malfunction is lost. In addition, the user may not know when the malfunction first commenced. In both cases, restoring a previous backup may not return the computer to an acceptable state.

SUMMARY

Briefly, aspects of the subject matter described herein relate to system state changes. In aspects, a state change monitor detects a state change, determines whether the state change is within a set of state changes that are monitored, and, if so, logs data regarding the state change. The data and any other data needed to rollback the state change is exported to other nodes. The other nodes may store the data for rollback or migration purposes and/or adjust their operation so that they may operate correctly in view of the state change.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
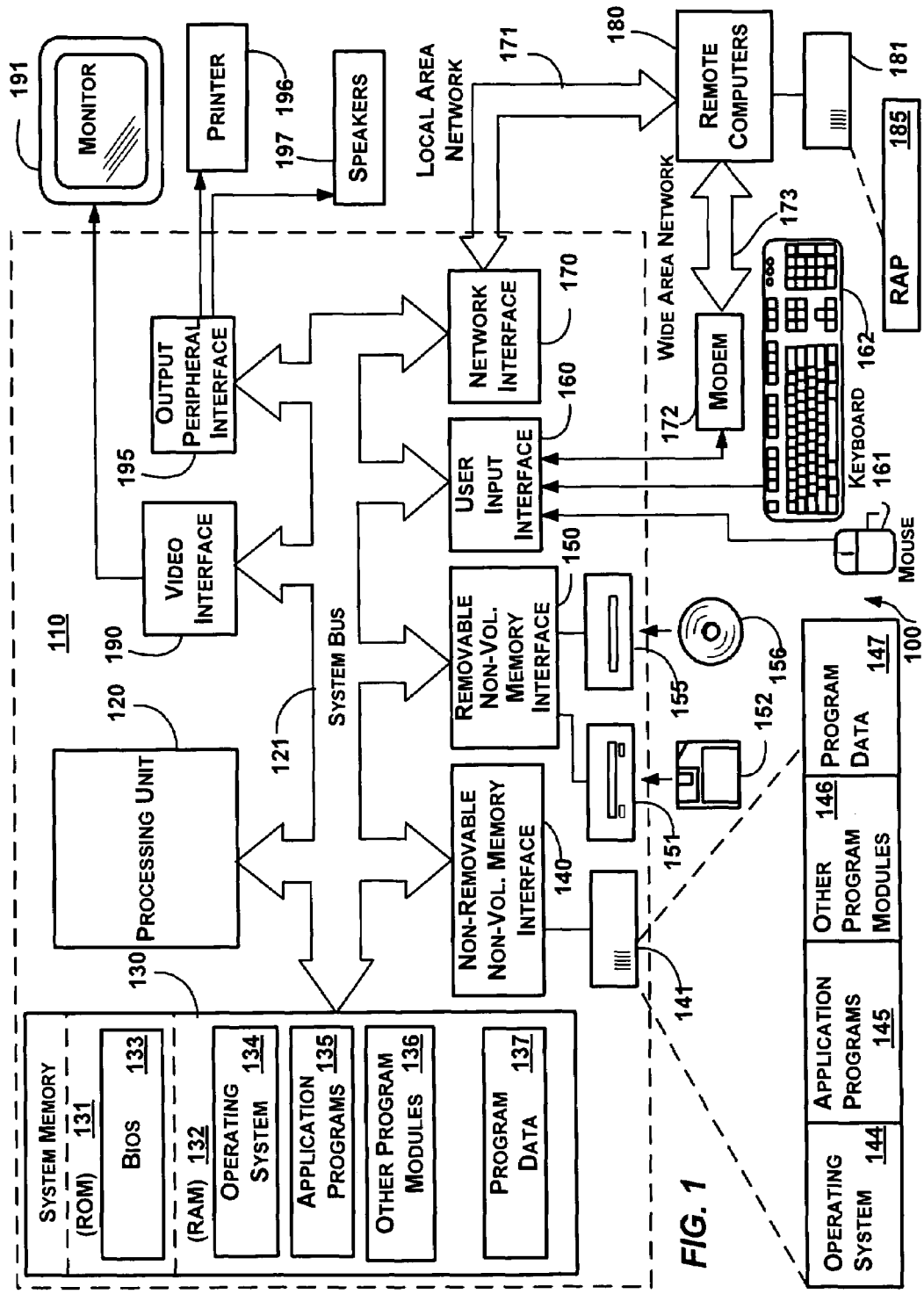
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Node State Storage and Recovery

Figure 2:
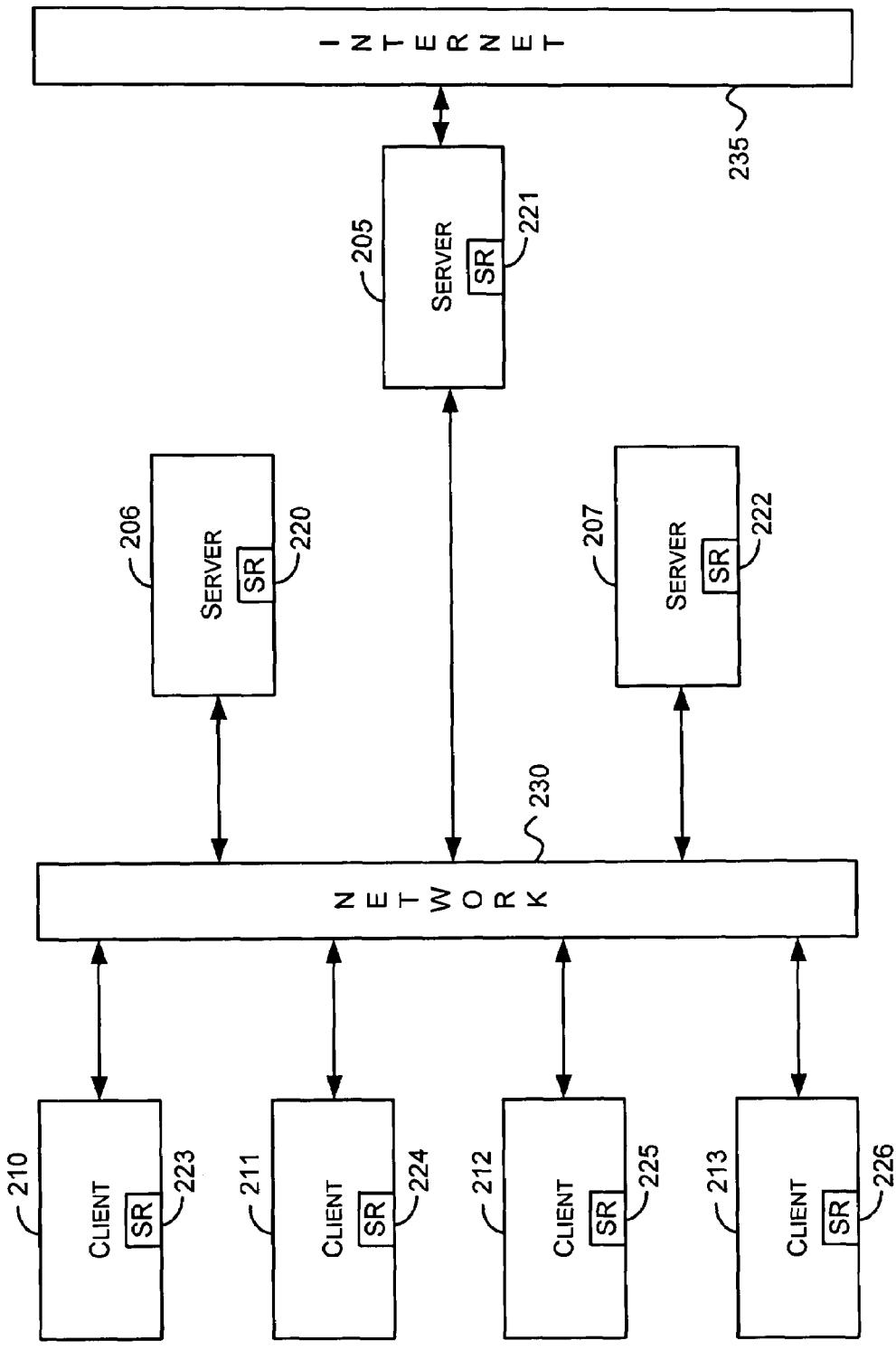
FIG. 2 is a block diagram representing an exemplary environment in which aspects of the subject matter described herein may be implemented.

FIG. 2 is a block diagram representing an exemplary environment in which aspects of the subject matter described herein may be implemented. In one embodiment, the environment includes servers 205-207 and clients 210-213 and may include other components (not shown). In other embodiments, the number of servers and clients and the arrangement thereof may be changed without departing from the spirit or scope of aspects of the subject matter described herein. Clients and servers may communicate with each other and with other entities (e.g., routers, firewalls, and other entities not shown) via various networks including intra-office network 230 and the Internet 235.

Each of the servers 206-207 and the clients 210-213 may be implemented on one or more computers (e.g., computer 110 as described in conjunction with FIG. 1). The servers 205-207 may be configured, for example, to perform specific functions. In one embodiment, for example, the server 206 may be configured as a management server. In this embodiment, the server 206 may monitor the other nodes (e.g., clients 210-213 and servers 205 and 207) of a configuration set to determine whether the other nodes are operating correctly, up-to-date with respect to software versions and anti-virus signatures, and the like. When the server 206 determines that a node that it is monitoring is not operating correctly or is not up-to-date, the server 206 may display or send a message to a console for viewing by a system administrator or the like (hereinafter collectively referred to as a "system administrator" or "user").

In addition, the server 206 may host a document repository in which documents, files, versions thereof, and the like may be stored. One exemplary document repository is SharePoint® produced by Microsoft Corporation of Redmond, Wash. In other embodiments, the server 206 may host other document repositories without departing from the spirit or scope of aspects of the subject matter described herein.

The server 206 may also host a directory service that stores and organizes information about a network's users, shares, and resources. The directory service may allow network administrators to control access to resources available through the network. Exemplary directory services include Network Information Service (NIS), eDirectory, Red Hat directory server, Active Directory, Open Directory, Apache Directory Server, and Oracle Internet Directory to name a few.

The server 206 may also host a Dynamic Host Configuration Protocol (DHCP) process that supplies each other local node with an IP address at which the node is accessible, a subnet mask, a default gateway, an IP address for a Windows® Internet Name Service (WINS) server, and an IP address for a Domain Name System (DNS) server.

The server 207 may include a replica of the directory service (and associated data) which may be used in case the directory service on the server 206 becomes non-operational or corrupt. In addition, the server 207 may include other applications, such as an e-mail server, calendaring software, a message store, an anti-virus engine that examines e-mails, and the like.

The server 205 may comprise an edge server that provides services such as access to resources and entities available on the Internet 235, firewall capability, spam filtering, authentication of remote users attempting to access resources connected to the network 230, anti-virus monitoring, port filtering, port forwarding, and the like.

The functions provided by each of the servers 205-207 may be distributed differently among the servers 205-207, more or fewer servers, and/or other devices (e.g., an stand-alone firewalls, routers, and the like) without departing from the spirit or scope of aspects of the subject matter described herein.

Each component that executes on a node may be associated with several pieces of data. This data may be distributed across various nodes. For example, a file accessing component on a client may access data that indicates a server from which the component should request information as to where files reside. When the client requests access to the file from the server, the server may refer the client to another server. As used herein, each of the terms "server" and "client" may refer to one or more physical entities, one or more processes executing on one or more physical entities, and the like.

It will be appreciated by those skilled in the art that the state associated with each of the servers 205-207 and client 210-213 may be highly complex and interrelated such that changing a configuration setting on one of the servers may, without appropriate corresponding action on other nodes, cause other servers and/or clients to lose access to services and/or resources. This is sometimes referred to as incorrect operation.

For example, changing a configuration setting on one node may cause two or more components that were previously cooperating to perform a service to cease doing so. These two or more components may reside on one or more nodes. As another example, changing the IP address of the server 205 may cause the other nodes to lose access to the Internet 235. As another example, changing an IP address of a directory service may cause other entities to lose access to this service. Other examples include changing the location of a Active Directory schema master, changing DNS server settings, changing DHCP server settings, firewall port forwarding, file share settings, distributed file system (DFS) file share machine names, backup locations, and the like. The examples above are not exhaustive of all the types of state changes that may cause incorrect operation. Indeed, those of skill in the art will readily understand that many other changes may cause nodes in a configuration set to lose access to resources, data, services, and the like.

State recovery components (e.g., state recovery components 220-226) may be included on the servers 206-207 and the clients 210-213. Each state recovery component may include components associated with storing and recovering state data of its associated node (or replacement node). This is described in more detail in conjunction with FIG. 3. A state recovery component may also include a component that indicates whether a change may affect other entities. This is described in more detail in conjunction with FIG. 4.

Furthermore, the state recovery components may monitor different state data on different nodes. For example, the state that is monitored on a client node may be different from the state that is monitored on a server node or even another client node. The state that is monitored on a server node may be different from the state that is monitored on another server node.

In another embodiment, the state that is monitored depends on a type of node (e.g., client or server). Each type of node has a certain set of state that is monitored while a different type of node has another set of state that is monitored.

Figure 3:
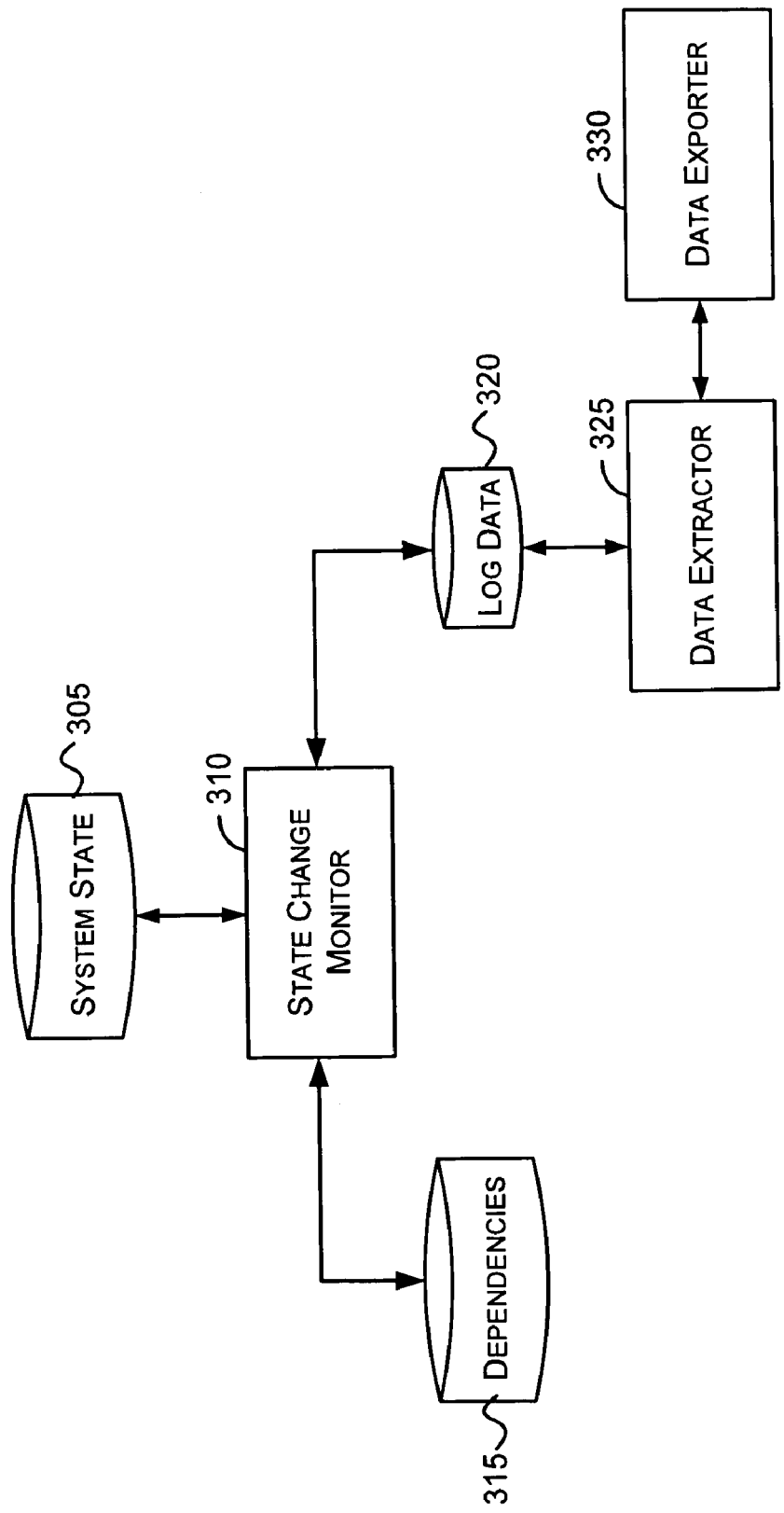
FIG. 3 is a block diagram that generally represents some exemplary components of a state recovery component in accordance with aspects of the subject matter described herein.

FIG. 3 is a block diagram that generally represents some exemplary components of a state recovery component in accordance with aspects of the subject matter described herein. In one embodiment, the exemplary components include the system state 305, a state change monitor 310, dependencies data 315, log data 320, a data extractor 325, and a data exporter 330. In other embodiments, more, fewer, or other components may be used to perform the functions of those shown in FIG. 3.

The system state 305 represents the state of a node or process and may include such things as data stored in volatile (e.g., RAM) or nonvolatile (e.g., disk) memory. The system state 305 may include variables, files, directories, registries, databases, other data stores, any portion or combination of the above, and the like.

The state change monitor 310 is a component that monitors state changes in the system state 305. The state change monitor 310 may be configured to monitor particular state changes while ignoring others. For example, the state change monitor 310 may monitor certain changes (e.g., IP address changes) within a registry while ignoring other changes within the registry (e.g., screen resolution, keyboard configuration, and the like). The state change monitor 310 may monitor changes to files in certain directories and their subdirectories while ignoring changes to files in other directories. The state change monitor 310 may monitor for certain changes in a database (e.g., a directory services database) or file while ignoring other changes in the database or file.

In one embodiment, the state that the state change monitor 310 monitors is determined by the dependencies data 315. In one embodiment, the dependencies data 315 may include information that indicates what state changes on a server, service, client, and/or other device or process (sometimes referred to herein as "entities") may affect operation on one or more other entities. For example, the dependency data 315 may include a state field that indicates a relevant state and a dependencies field that indicates the entities that may be affected when the state is changed. For example, changing the IP address of an e-mail server may cause entities (e.g., clients and other servers) referencing the e-mail server to be unable to obtain e-mail from the e-mail server. The dependencies data 315 may be modified automatically (e.g., through discovery of new or deleted entities) and/or manually via a system administrator.

Entities affected by a state change may comprise one or more servers, clients, appliances, and hardware devices which may be located locally and/or remotely. As such, the dependency data 315 may identify an external IP address of an edge server (e.g., server 205 of FIG. 2) and identify affected entities including internal firewalls, routers, outside services, devices, and other entities.

In another embodiment, a system administrator identifies and may indicate state that the state change monitor 310 monitors. Some state may not affect other entities if it is changed but may still be needed for recovery should an entity become nonfunctional or operate incorrectly. A system administrator may identify this state data to the system change monitor 310 which may then monitor for changes to the state.

In yet another embodiment, relevant state is hard-coded such that it ships with an operating system, application, or some other software component. For example, it may be determined that a particular subset of a registry and files is relevant to restoring a server to a recent operational state after the server has been restored from a backup. Information regarding this subset may hard-coded into the application so that state changes to this state is monitored by state change monitor 310.

In yet other embodiments, the state that the state change monitor 310 monitors may comprise some combination of the relevant state identified above. For example, the state change monitor 310 may monitor for state changes including any combination or permutation of state relevant to the dependency data 315, state indicated by a system administrator, and hard-coded relevant state.

When the state change monitor 310 detects a change to state of interest, the state change monitor 310 may add an entry to the log data 320. This entry may include a timestamp, the change, type of change, who caused the change (or was logged in when the change occurred), comments from a person who caused the change, an identifier identifying the node upon which the change occurred, data needed to rollback the change, and the like. The log data 320 may be arranged as a database, a flat file, or in some other format without departing from the spirit or scope of aspects of the subject matter described herein. Arranging the log data 320 as a database may allow fast rollback and recovery if needed.

In some embodiments, the state change monitor 310 may log just the state change. In such embodiments, a data extractor 325 may add additional information including the information identified in the preceding paragraph. In embodiments where the state change monitor 310 places the data identified in the preceding paragraph into the log data 320, the data extractor 325 may be omitted or may be simplified to a data reader that reads the data and provides it to the data exporter 330.

The data exporter 330 replicates data extracted by the data extractor 325 to one or more other nodes. The other nodes may then store a copy of the data. Periodically, the data exporter 330 may send updates to the data to the other nodes. In one embodiment, these updates are sent in deltas rather than sending all the data with each update. If the data on the node from which the data was extracted is lost or corrupted, it may then be restored from one of the other nodes upon which the data is replicated.

In one embodiment, data from one or more nodes is stored and replicated across nodes participating in a configuration set so that a rollback of a change that affects more than one node may be accomplished based on the data. For example, changing an IP address on an e-mail server may cause other machines to change the IP address from which they access e-mail. In this embodiment, it may be sufficient to store the old IP address together with information that identifies the entities that rely on IP address. If a rollback of state is desired, this information may be used to configure a node to have the old IP address and configure other nodes to access e-mail from the node. In other embodiments, relevant data from other nodes may also need to be replicated to rollback state on all participating nodes.

In an embodiment, the state change monitor 310 may monitor for changes to nodes in an external network such as the Internet 235. All or part of the dependencies data 315 may be stored by a web service that executes on the external network. The data exporter 330 may also execute as part of the web service. Notification of state changes may be exported by the data exporter 330 to nodes (local or remote) that request such notification. The web service may also provide information that indicates how a node may continue to access a node in the external network that has changed states.

In another embodiment, the state change monitor 310 may monitor for changes to nodes connected to a local network such as the network 230. Nodes connected to a remote network such as the Internet 235 may be notified of state changes to nodes connected to the local network so that they may continue to operate correctly in view of the state changes.

Figure 4:
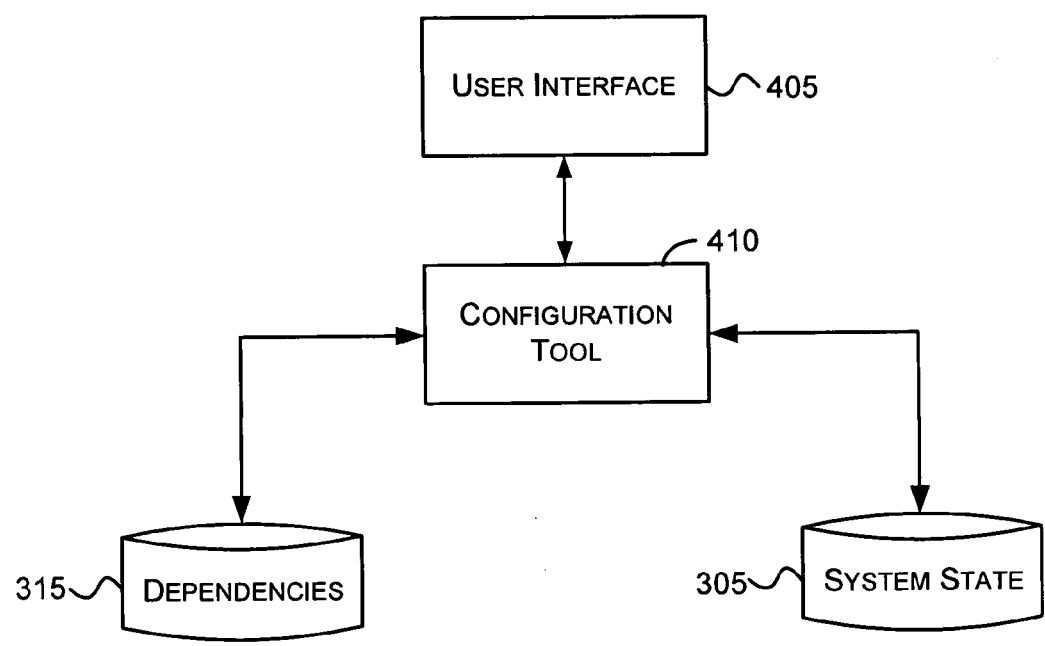
FIG. 4 is a block diagram that generally represents some exemplary components of a state recovery component that may be used to notify a system administrator of what will be affected by a configuration change in accordance with aspects of the subject matter described herein.

FIG. 4 is a block diagram that generally represents some exemplary components of a state recovery component that may be used to notify a system administrator of what will be affected by a configuration change in accordance with aspects of the subject matter described herein. In one embodiment, the exemplary components include a user interface 405, a configuration tool 410, dependencies data 315, and system state 305.

The configuration tool 410 is a component that allows a system administrator to make configuration changes. Some exemplary configuration changes may be changing an IP address of a server, changing where files reside, changing an address at which other servers may be reached, changing registry keys or values, changing database values, and the like. The configuration tool 410 may present a user interface 405 for a system administrator to interact with the configuration tool 410. Through the user interface 405, the system administrator may instruct the configuration tool 410 to make configuration changes.

If the configuration tool 410 determines (e.g., via the dependencies data 305 or otherwise) that a change may affect the operation of another entity, the configuration tool 410 may provide a notification to the system administrator. The notification may identify the other entities that may be affected if the change takes place and may provide instructions as to what needs to be done to inform or fix these other entities so that they will operate correctly after the change has occurred. For example, changing the IP address of an e-mail server may cause entities referencing the mail server to operate incorrectly. A notification from the configuration tool 410 may indicate this possibility together with what entities may need to be reconfigured to operate correctly.

In one embodiment, the configuration tool 410 may include a notification mechanism that allows it to automatically notify all affected entities. The notification may include data that allows each entity to configure itself to continue operating correctly in view of the change.

In addition, the configuration tool 410 with or without the mechanisms described in conjunction with FIG. 3 may place an entry in the log data 320 of FIG. 3 that indicates the change and entities affected thereby. The entry may also include information that allows the change to be rolled back on the server and all other affected entities. For example, the changing of an IP address of am e-mail server may cause an entry to be written in the log data that indicates the old IP address and entities that need to be updated if the change is rolled back.

In one embodiment, the entities that need to be updated if the change is rolled back are identified by a reference to the dependencies data. If different entities exist when the rollback occurs as compared to when the change occurred, the different entities may be configured to work correctly with the rolled back state.

In one embodiment, the configuration tool 410 may determine not to provide notification to a system administrator for certain configuration changes. For example, the configuration tool 410 may "care" about changes from one set of IP addresses to another set of IP addresses but may not care about changes from one IP address to another IP address within a another set of IP addresses. If a system administrator wants to change an IP address of a monitored IP address, one or more other tests may be performed to determine whether a notification needs to be sent to the system administrator. In one embodiment, a process or routine may be called to determine whether a notification needs to be sent before allowing the change. The notification may allow the system administrator to cancel or confirm the change. If the system administrator confirms the change, information about the change may be logged as described previously.

Figure 5:
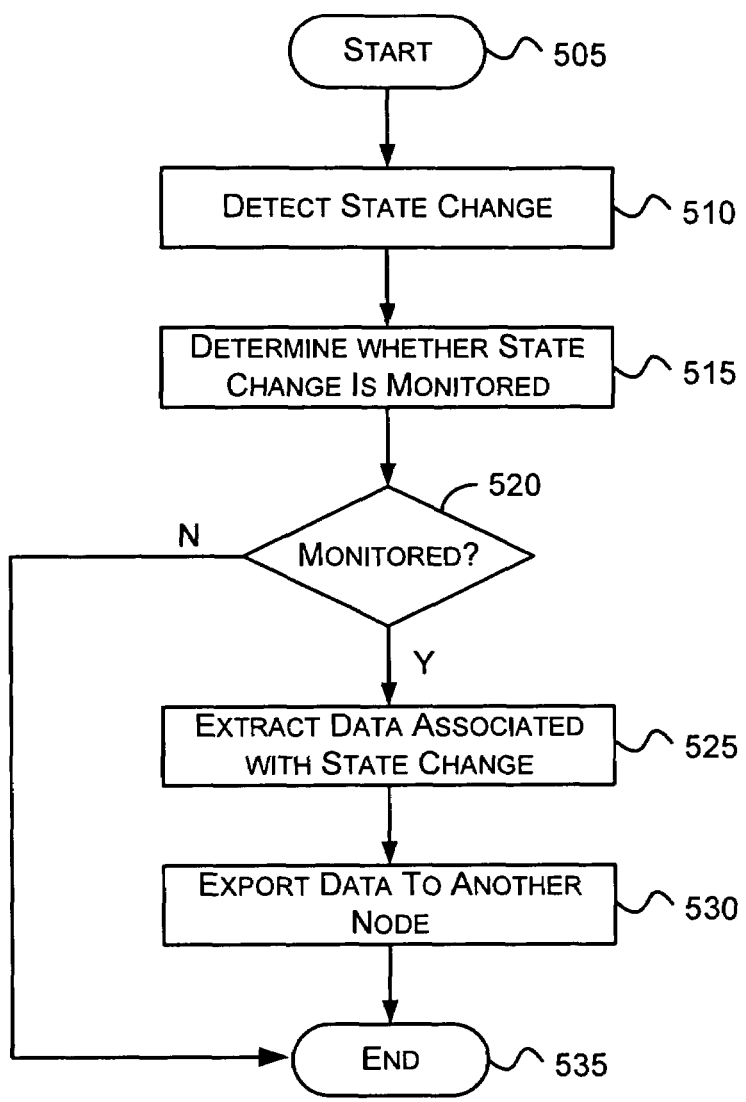
FIG. 5 is a flow diagram that generally represents exemplary actions that may occur regarding state changes in accordance with aspects of the subject matter described herein.

FIG. 5 is a flow diagram that generally represents exemplary actions that may occur regarding state changes in accordance with aspects of the subject matter described herein. At block 505, the actions begin.

At block 510, a state change is detected on a node of a configuration set. For example, referring to FIG. 2, the state recovery component 220 may detect that a key in a registry is being changed on the server 206.

At block 515, a determination is made as to whether the state change is within a set of state changes that are to be monitored. If so, at block 520, the actions continue at block 525; otherwise, the actions continue at block 535. For example, if a user has indicated that changes to the key are to be monitored, the actions would continue at block 525; otherwise, the actions would end at block 535.

At block 525, data associated with the state change is extracted to allow a rollback or recovery of the state that existed on the node just prior to the state change. For example, if an IP address was changed, the old IP address and an indication of entities affected may be extracted and stored.

At block 530, this data is exported to another node. For example, referring to FIG. 2, the data extracted by the state recovery component 220 may be exported to the servers 205 and 207. These servers 205 and 207 may then store this state. In this way, if the server 206 becomes non-operational or operates in a non-desired way, this state that has been exported and stored may then be used to restore the server 206 (or another server to which state is migrated) to a state that existed just prior to the state change.

At block 535, the actions end. These actions may be repeated in whole or in part each time a state change occurs. In one embodiment, data regarding state changes is exported on a periodic basis and may include data regarding more than one state change.

Figure 6:
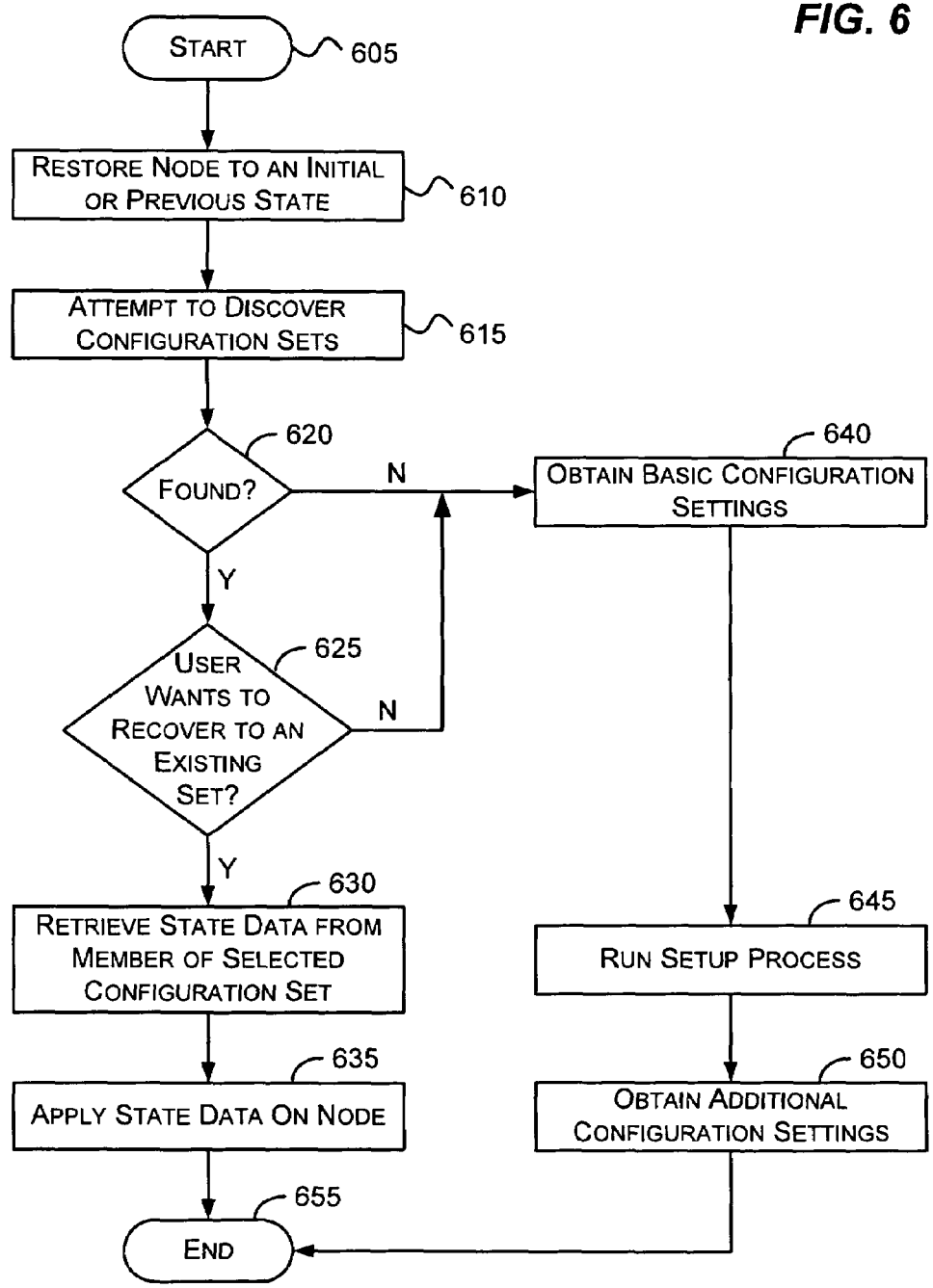
FIG. 6 is a flow diagram that generally represents exemplary actions that may occur in recovering state data to a node according to aspects of the subject matter described herein.

FIG. 6 is a flow diagram that generally represents exemplary actions that may occur in recovering state data to a node according to aspects of the subject matter described herein. At block 605, the actions begin.

At block 610, the node is restored to an initial or previous state. As an example, an initial state may include formatting a hard drive, reinstalling an operating system, and reinstalling state recovery components. To return to a previous state of the node may involve restoring a backup to the node. Note that restoring the node to an initial or previous state may also involve the actions described above being performed on a new node. This may occur, for example, if it is desired to migrate the node's state to another node.

At block 615, the state recovery components on the node attempt to discover configuration sets. A configuration set comprises a set of nodes from which configuration data is monitored and replicated on other nodes. In one embodiment, the node attempts to discover a configuration set that is missing or unable to communicate with one or more members of the configuration set.

At block 620, if a configuration set is found, the actions continue at block 625; otherwise, the actions continue at block 640.

At block 625, the user is prompted as to whether the user wants to recover the node to an existing configuration set. If so, the actions continue at block 630; otherwise, the actions continue at block 640. This allows the user to select to recover state data of an existing configuration set to a node or to start another configuration set.

At block 630, state data is retrieved from a member of the selected configuration set. At block 635, this state data is applied to the node to update the node's state data to an appropriate state.

At block 640, basic configuration settings are obtained. Basic configuration settings may include settings needed to connect the node to a firewall, a router, gateways, a DHCP server, a DNS server, and the like.

At block 645, the setup process is executed on the node. State changes are monitored at this time and recorded in the log data as appropriate.

At block 650, additional configuration settings are obtained. Additional configuration settings may include addresses of other servers or clients that are to be included in the configuration set, for example.

At block 655, the actions end and the node has been recovered or set up to run in an existing or new configuration set.

In another embodiment, a recovery tool may provide the option of rolling back changes. The recovery tool may allow a user to view a history of changes and rollback one or more of the changes. The user may rollback the one or more changes without restoring a node to an initial or previous state. Furthermore, other nodes may be notified of the one or more changes as described previously so that they may operate correctly in view of the rolled back changes.

Figure 7:
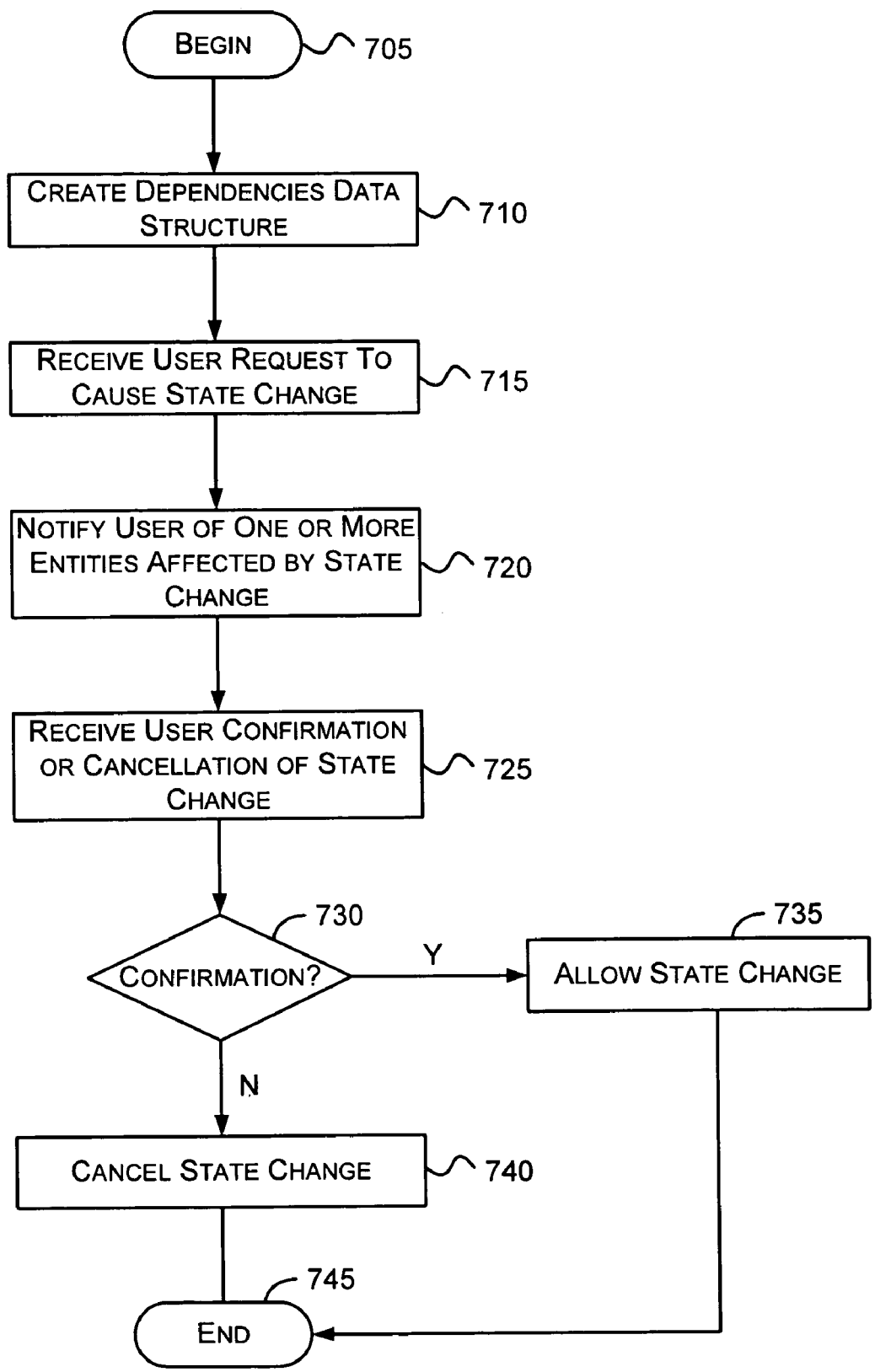
FIG. 7 is a flow diagram that generally represents exemplary actions that may occur regarding requests to cause state changes in accordance with aspects of the subject matter described herein.

FIG. 7 is a flow diagram that generally represents exemplary actions that may occur regarding requests to cause state changes in accordance with aspects of the subject matter described herein. At block 705, the actions begin.

At block 710, a dependencies data structure is created. For example, referring to FIG. 4, dependencies data 315 is created.

At block 715, a request to cause a state change is received from a user. For example, referring to FIG. 4, a configuration tool 410 receives a request from the user interface 405 to change a state of system state 305.

At block 720, the user is notified or one or more entities affected by the state change. For example, the user may be notified that other entities of a configuration set may not be able to access e-mail (without further action) if an IP address of an e-mail entity is changed.

At block 725, user confirmation or cancellation of the state change is received. For example, referring to FIG. 4, the configuration tool 410 receives a confirmation or cancellation from the user interface 405 to change a state of the system state 305.

At block 730, if the user confirms the change, the actions continue at block 735 where the state change is allowed. If the user cancels the state change, the actions continue at block 740, where the state change is cancelled or not allowed to proceed.

At block 745, the actions end.

It should be understood that the actions described in conjunction with FIGS. 5-7 are not all-inclusive of all the actions that may be taken. Furthermore, although the actions are described in one embodiment as occurring in a particular order, in other embodiments, some of the actions may occur in parallel or may be performed in another order without departing from the spirit or scope of the subject matter described herein.

As can be seen from the foregoing detailed description, aspects have been described related to system state changes. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions for executing in a networked environment, comprising:
   detecting a state change on a first node of a configuration set, wherein the configuration set includes a plurality of nodes for which at least one state change of the first node has a potential for causing incorrect operation of at least the first node or a second node of the configuration set;
   determining whether the state change is within a set of state changes for which monitoring is selected;
   extracting data associated with the state change, the data including information about a state that existed before the state change that allows a rollback or recovery to the state; and
   exporting the data to at least one other node of the plurality of the nodes.

2. The computer-readable storage medium of claim 1, wherein the incorrect operation comprises an inability to access a resource in the networked environment that was accessible immediately prior to the state change.

3. The computer-readable storage medium of claim 1, wherein the incorrect operation comprises erroneously ceasing to provide a service by two or more previously cooperating components of at least one node of the configuration set.

4. The computer-readable storage medium of claim 1, wherein determining whether the state change is within a set of state changes for which monitoring is selected comprises consulting a dependencies store that indicates a state change and entities affected by the state change.

5. The computer-readable storage medium of claim 4, wherein entities affected by the state change comprise one or more network appliances, routers, firewalls, clients, servers, or services accessible through the networked environment.

6. The computer-readable storage medium of claim 1, wherein the set of state changes for which monitoring is selected comprises state indicated by a system administrator.

7. The computer-readable storage medium of claim 1, wherein the set of state change for which monitoring is selected comprises state hard-coded in a software component.

8. The computer-readable storage medium of claim 1, further comprising:
   restoring the first node to a previous state;
   importing the data from the at least one other node;
   applying the data to the first node to configure the node to a state that existed just prior to the state change; and
   providing information regarding the state that existed just prior to the state change to any nodes affected by the state change.

9. A method implemented at least in part by a computer, the method comprising:
   creating a dependencies data structure that includes data regarding a plurality of state changes, wherein the data associates at least one entity potentially affected by a state change with the state change;
   receiving an indication that a user has requested to cause the state change;
   notifying the user of the at least one entity potentially affected by the state change;
   receiving a user confirmation or cancellation regarding causing the state change;
   if a user confirmation is received, allowing the state change; and
   if a user cancellation is received, cancelling the state change.

10. The method of claim 9, further comprising using the dependencies data structure to determine what state changes are monitored by a state change monitor.

11. The method of claim 9, wherein the dependencies data structure is automatically updated in response to the at least one entity becoming connected to or disconnected from a network connecting a plurality of entities.

12. The method of claim 9, further comprising exporting data regarding the state change from a first entity to a second entity, wherein the data includes a timestamp corresponding to a time at which the state change occurred, an identifier identifying an entity upon which the change occurred, and information to rollback the state change.

13. The method of claim 9, further comprising notifying all affected entities regarding the state change and updating the affected entities in response to the state change such that the affected entities are able to continue communicating with an entity upon which the state change occurred.

14. In a computing environment, an apparatus, comprising:
- a state change monitor arranged to monitor selected changes to system state and to log information in a log data structure in response thereto;
- a dependencies data structure including a state field that indicates a state of an entity and an associated dependencies field that indicates at least one other entity potentially affected by a change of the state; and
- a data exporter arranged to export data regarding state changes to other entities.

15. The apparatus of claim 14, wherein the information comprises one or more of a timestamp corresponding to a time at which a change occurred, an identifier that identifies a user who caused the change to occur, an identifier that identifies a node upon which the change occurred, and data to rollback to a state that existed just prior to the change.

16. The apparatus of claim 14, wherein the data indicates network information that allows the other entities to communicate with the entity.

17. The apparatus of claim 14, further comprising a data extractor arranged to read the log data structure and derive additional data therefrom, wherein the additional data includes information to rollback state changes.

18. The apparatus of claim 17, wherein the additional data includes an identification of entities affected by each state change.

19. The apparatus of claim 14, wherein the system state includes one or more of a variable, a file, a directory and its subdirectories, one or more entries in a registry, and one or more entries in a database.

20. The apparatus of claim 14, wherein the entity and the dependencies data structure are located on a network external to the other entities and wherein the data exporter is further arranged to export the data regarding state changes to at least one of the other entities in response to a request from the at least one of the other entities.

* * * * *